United States Patent [19]

Hayashi et al.

[11] Patent Number: 5,428,661
[45] Date of Patent: Jun. 27, 1995

[54] TERMINATING CALL CONTROL METHOD AND SYSTEM THEREFOR IN A DIGITAL SWITCHING UNIT USED WITH SUBSCRIBER GROUPS

[75] Inventors: Mitsuru Hayashi; Nobuyuki Sakai, both of Tokyo, Japan

[73] Assignee: NEC Corporation, Tokyo, Japan

[21] Appl. No.: 239,127

[22] Filed: May 6, 1994

[30] Foreign Application Priority Data

May 11, 1993 [JP] Japan .................................. 5-109367

[51] Int. Cl.⁶ ....................... H04M 1/24; H04M 3/08; H04J 3/14; H04J 1/16
[52] U.S. Cl. ......................................... 379/10; 379/14; 379/15; 379/27; 370/13; 370/15; 370/16
[58] Field of Search ............................... 379/2, 10-15, 379/27; 370/13, 15, 16

[56] References Cited

U.S. PATENT DOCUMENTS

| | | | |
|---|---|---|---|
| 4,365,248 | 12/1982 | Bargeton | 370/16 |
| 4,442,518 | 4/1984 | Morimoto | 379/2 |
| 4,680,776 | 7/1987 | Ikeuchi | 370/16 |
| 4,878,048 | 10/1989 | Gottesman | 379/27 |
| 4,996,702 | 2/1991 | Gray | 379/27 |
| 5,001,741 | 3/1991 | Sayer | 379/15 |
| 5,073,774 | 12/1991 | Ikawa | 379/2 |

FOREIGN PATENT DOCUMENTS 57-155867 9/1982 Japan.

*Primary Examiner*—Stephen Chin
*Assistant Examiner*—Vijay Shankar
*Attorney, Agent, or Firm*—Foley & Lardner

[57] ABSTRACT

A terminating, or an incoming, call control method, in which a subscriber group constituted by a plurality of subscriber telephone sets respectively accommodated in, or connected to, a plurality of lower switching units and sharing a terminating call is set. A host switching unit parallelly accommodating the lower switching units is caused to monitor that a fault has occurred in at least one of the lower switching units. When a terminating call is made for one of the subscriber telephone sets accommodated in one lower switching unit, of the lower switching units, in which the fault has occurred, the host switching unit is caused to assign the terminating call to one fault-free lower switching unit which accommodates a given subscriber telephone set belonging to the same subscriber group as that of a call incoming destination subscriber telephone set in the subscriber telephone sets. The fault-free lower switching unit is caused to transfer the terminating call to the given subscriber telephone set belonging to the same subscriber group as that of the call incoming destination subscriber telephone set.

8 Claims, 2 Drawing Sheets

5,428,661

TERMINATING CALL CONTROL METHOD AND SYSTEM THEREFOR IN A DIGITAL SWITCHING UNIT USED WITH SUBSCRIBER GROUPS

BACKGROUND OF THE INVENTION

The present invention relates to a terminating call control method and a system therefor and, more particularly, a terminating call control method and a system therefor in a digital switching unit incorporating subscriber lines and having a common line signal processing device and a subscriber information storage device.

A prior art will be described with reference to FIG. 2.

FIG. 2 shows a switching system for explaining a conventional terminating, or incoming, call control scheme. This scheme is referred to as a first conventional scheme.

FIG. 2 shows a switching system part constituted by a host switching unit 1 and lower switching units 2 and 3. Subscriber telephone sets 5 and 6 constitute a subscriber group 4 which shares a terminating, or incoming, call. The subscriber telephone sets 5 and 6 are connected to the switching units 2 and 3 through subscriber lines, respectively. The switching units 1, 2, and 3 comprise central processing units 40, 41, and 42, time-division networks 10, 11, and 12, and common line signal processing devices 50, 51, and 52, respectively. The switching unit 1 also has speech path trunks 20 and 21 and signal trunks 30 and 31. The subscriber group sharing a terminating call is defined as a group of subscriber telephone sets in which a call (including both extension and incoming calls) terminated at a given telephone set can be received by another telephone set or transferred thereto. The switching units 2 and 3 also have speech path trunks 22 and 23, signal trunks 32 and 33, subscriber control circuits 60 and 61, and subscriber circuits 70 and 71, respectively. In addition, the switching units 1 to 3 comprise subscriber information storage devices (not shown), respectively. Each subscriber information storage device stores basic information (a subscriber number, accommodation position information, and service information) of each subscriber telephone set accommodated in a home switching unit, and a subscriber group number representing a subscriber group to which each subscriber of the home switching unit belongs, if any subscriber group is present.

The operation of the switching system in FIG. 2 will be described below.

Referring to FIG. 2, when a fault has occurred in the switching unit 3 to disable call processing (a switching unit in which the fault has occurred is referred to as a fault switching unit hereinafter), the speech path trunk 23 of the switching unit 3 is closed. When the speech path trunk 21 of the host switching unit 1 confirms that the speech path trunk 23 is closed, this is informed to the central processing unit 40 through the time-division network 10.

When the switching unit 1 receives a terminating call to the subscriber telephone set 6 connected to the subscriber line accommodated in the fault switching unit 3, the central processing unit 40 informs a switching unit issuing the terminating call of a call incoming disable state because the fault has occurred in the switching unit 3 to disable call processing, thereby completing the processing.

A call control scheme for remedying a terminating call to a subscriber telephone set accommodated in the fault switching unit upon occurrence of the fault in the switching unit to disable call processing is described in Japanese Patent Laid-Open No. 57-155867. This scheme is referred to as a second conventional scheme.

In the second conventional scheme, a telephone set of duplicate homing arrangement connected to both a first subscriber line accommodated in a first switching unit and a second subscriber line accommodated in a second switching unit is arranged, subscriber numbers of duplex number service which consist of a first telephone number sent through the first switching unit and a second telephone number sent through the second switching unit are assigned to this telephone set. A calling switching unit selects a speech path passing through the first switching unit in accordance with the first telephone number of the subscriber numbers. When a fault occurs in the first switching unit or the first subscriber line, the first switching unit sends a communication disable signal to the calling switching unit. Upon reception of the communication disable signal, the calling switching unit reads out the second telephone number from the subscriber numbers to select the speech path passing through the second switching unit.

According to the first conventional scheme, when a fault occurs in a switching unit accommodating a subscriber telephone set constituting the subscriber group to disable call processing, a terminating call to a subscriber telephone set connected to the fault switching unit is disabled. According to the second conventional scheme, two subscriber lines are required for one subscriber telephone set to result in high cost. In addition, the line efficiency is degraded because the two subscriber lines are assigned to one telephone set for a fault which rarely occurs.

SUMMARY OF THE INVENTION

It is an object of the present invention to provide a terminating call control method and a system therefor, in which a terminating call having, as a terminating destination, a subscriber telephone set accommodated in a switching unit in which a fault has occurred, can be remedied without greatly modifying an existing system.

It is another object of the present invention to provide a terminating call control method and a system therefor, in which a terminating call having, as a terminating destination, a subscriber telephone set accommodated in a switching unit in which a fault has occurred, can be remedied without greatly reducing the line usage.

In order to achieve the above objects of the present invention, there is provided a terminating call control method comprising the step of setting a subscriber group constituted by a plurality of subscriber telephone sets respectively accommodated in a plurality of lower switching units and sharing a terminating call, the step of causing a host switching unit parallelly accommodating the lower switching units to monitor that a fault has occurred in at least one of the lower switching units, the assignment step of, when a terminating call is made for one of the subscriber telephone sets accommodated in one lower switching unit, of the lower switching units, in which the fault has occurred, causing the host switching unit to assign the terminating call to one fault-free lower switching unit which accommodates a given subscriber telephone set belonging to the same subscriber group as that of a call incoming destination subscriber telephone set in the subscriber telephone sets, and the transfer step of causing the fault-free lower switching unit to transfer the terminating call to the given subscriber telephone set belonging to the same subscriber group as that of the call incoming destination subscriber telephone set.

DESCRIPTION OF THE PREFERRED EMBODIMENT

Figure 1:
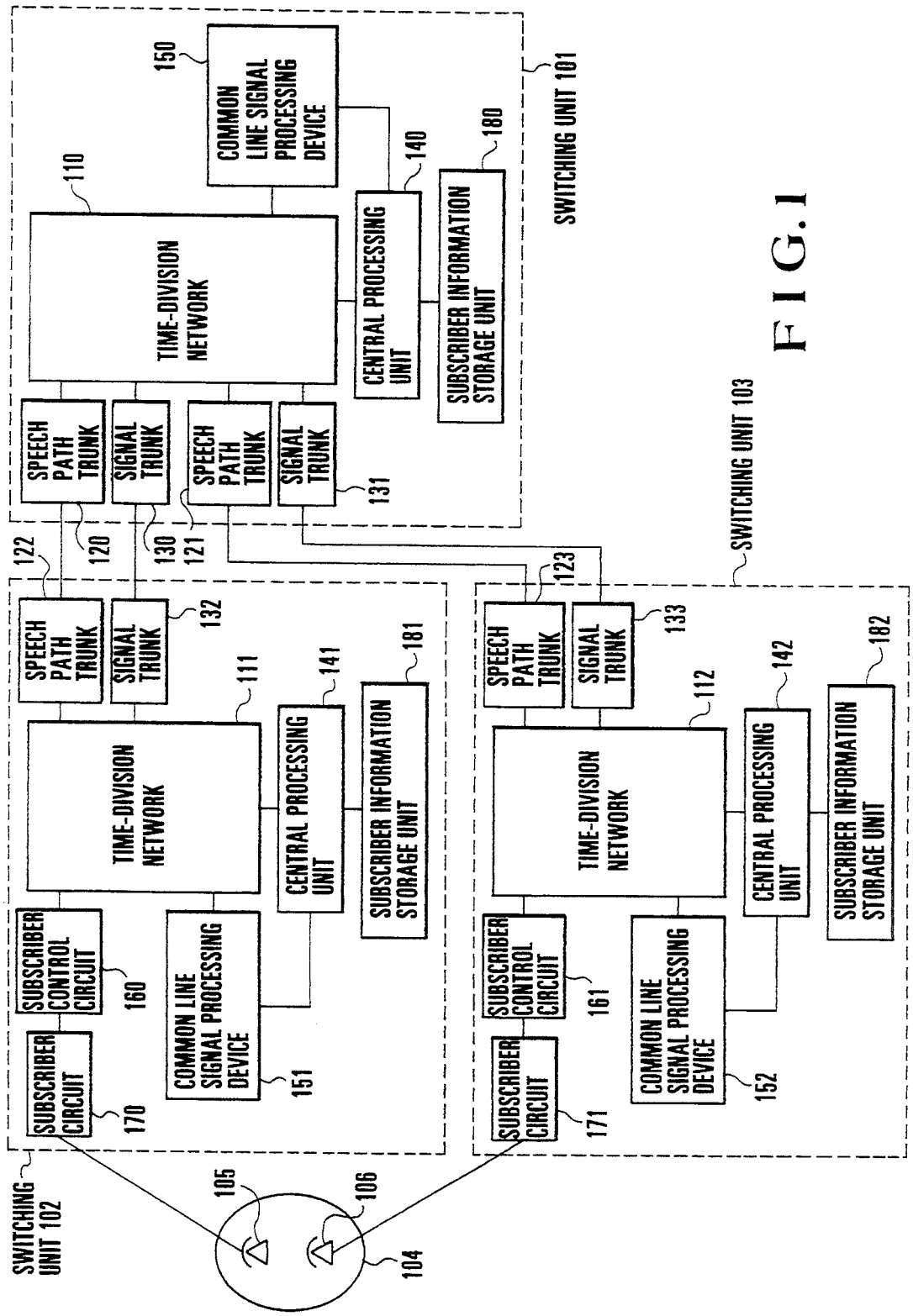
FIG. 1 is a block diagram of a switching system which employs a terminating call control method according to an embodiment of the present invention.
Figure 2:
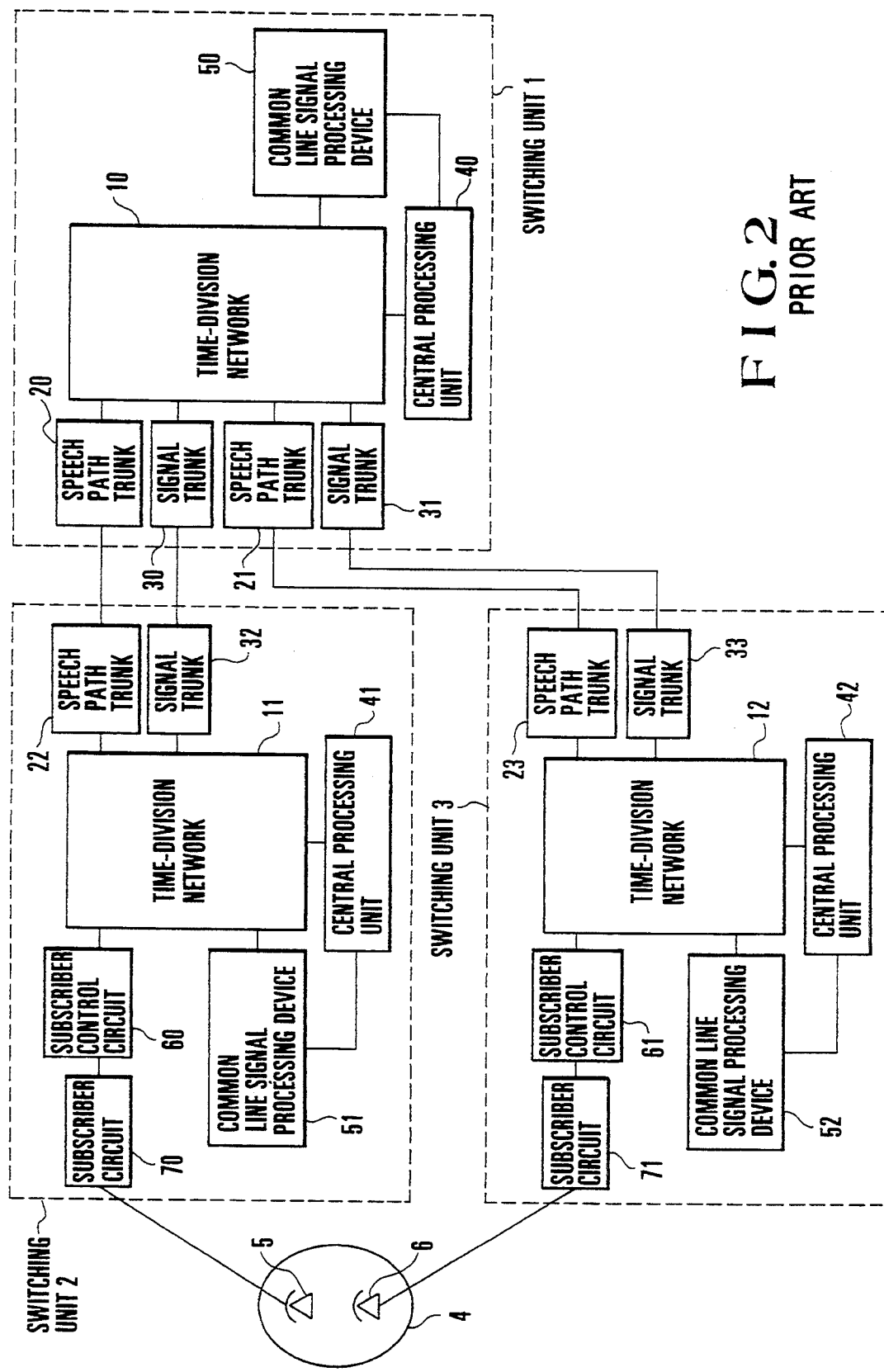
FIG. 2 is a block diagram of a switching system for explaining a conventional terminating call control method.

The present invention will be described with reference to FIG. 1. FIG. 1 shows a switching system to which a terminating call control method of the present invention is applied. This switching system comprises a host switching unit 101 and lower switching units 102 and 103 connected to the host switching unit 101. Subscriber telephone sets 105 and 106 constituting a subscriber group 104 are connected to the switching units 102 and 103 through subscriber lines, respectively. The switching unit 101 comprises a central processing unit 140 for controlling a switching operation, a time-division network 110 controlled by the central processing unit 140 to perform time-division switching, speech path trunks 120 and 121 connected to the time-division network 110, signal trunks 130 and 131 connected to the time-division network 110, and a common line signal processing unit 150 connected to the time-division network 110. The switching units 102 and 103 comprise central processing units 141 and 142 for controlling switching operations, time-division networks 111 and 112 for performing time-divisional switching under the control of the central processing units 141 and 142, speech path trunks 122 and 123 connected to the time-division networks 111 and 112, signal trunks 132 and 133 connected to the time-division networks 111 and 112, common line signal processing units 151 and 152 connected to the time-division networks 111 and 112, subscriber control circuits 160 and 161 connected to the time-division networks 111 and 112, and subscriber circuits 170 and 171 connected to the subscriber control circuits 160 and 161. The speech path trunk 120 and the signal trunk 130 of the switching unit 101 are connected to the speech path trunk 122 and the signal trunk 132 of the switching unit 102, respectively. The speech path trunk 121 and the signal trunk 131 of the switching unit 101 are connected to the speech path trunk 123 and the signal trunk 133 of the switching unit 102, respectively. The speech path trunks 120, 121, 122, and 123 form a terminating, or an incoming call path, and the signal trunks 130, 131, 132, and 133 perform signal transmission/reception. The common line signal processing units 150, 151, and 152 transmit/receive fault information, call incoming information, and call incoming enable information. The subscriber control circuits 160 and 161 transmit/receive various control signals between the central processing units 111 and 112 and the subscriber telephone sets 105 and 106. The subscriber circuits 170 and 171 constitute interface circuits of the subscriber telephone sets 105 and 106 which include detection functions.

Reference numerals 180, 181, and 182 denote subscriber information storage units connected to the central processing units 110, 111, and 112, respectively. The subscriber information storage units 181 and 182 store subscriber group information in addition to basic information such as the subscriber numbers, accommodation position information, and service information of the subscriber telephone sets 105 and 106 accommodated in, or connected to, the home switching units 102 and 103. The subscriber group information includes the number of the subscriber group 104 to which the subscriber telephone set 105 or 106 accommodated in the home switching units 102 or 103 belongs, and subscriber number information of the subscriber telephone set 106 or 105 accommodated in the other switching unit 103 or 102 constituting the subscriber group 104 to which the subscriber telephone set 105 or 106 accommodated in the home switching unit 102 or 103 belongs. The switching units 102 and 103 can detect the subscriber number of the subscriber telephone set 106 or 105 which belongs to the same subscriber group 104 as that of the subscriber telephone set 105 or 106 accommodated in the switching unit 102 or 103 and which is accommodated in the other switching unit 103 or 102. A terminating, or an incoming, call to the subscriber telephone unit 106 or 105 accommodated in the distant switching units 103 or 102 can be switched to a terminating call to the subscriber telephone set 105 or 106 of the same subscriber group 104 accommodated in the home switching unit 102 or 103. On the other hand, the subscriber information storage unit 180 arranged in the host switching unit 101 prestores all subscriber information group information stored in the subscriber information storage units 181 and 182.

The operation of this embodiment will be described with reference to FIG. 1.

Referring to FIG. 1, when a fault has occurred in the switching unit 103 to disable call processing, the speech path trunk 123 of the switching unit 103 is closed. When the speech path trunk 121 of the host switching unit 101 confirms that the speech path trunk 123 is closed, this is informed to the central processing unit 140 through the time-division network 110. The central processing unit 140 stores, in the subscriber information storage unit 180, fault information representing that the fault has occurred in the switching unit 103 or information representing that the subscriber telephone set 106 is set in a call incoming disable state. When the switching unit 101 receives a terminating call to the subscriber telephone set 106 belonging to the subscriber group 104, the central processing unit 140 transmits the fault information of the switching unit 103 which is stored in the subscriber information storage device 180 to the common line signal control unit 150. The common line signal control unit 150 transmits the received fault information to the signal trunk 130 through the time-division network 110o At this time, on the basis of the subscriber group information and the fault information which are stored in the subscriber information storage unit 180, the time-division network 110 performs a switching operation to select the signal trunk 130 and the common line signal control unit 150, both of which correspond to the switching unit 102 free from any fault and accommodating the subscriber telephone set 105 belonging to the same subscriber group 104 as that of the call incoming destination subscriber telephone set 106. The signal trunk 130 transmits the received fault information to the signal trunk 132 of the switching unit connected thereto. The signal trunk 132 transmits the received fault information to the common line signal processing unit 151 through the time-division network 111. The common line signal processing unit 151 transmits the received fault information to the central processing unit 141. Upon reception of the fault information, the central processing unit 141 starts subscriber information storage unit 181. As described above, the subscriber information allows for switching a terminating call from the subscriber telephone set 106 to the home subscriber telephone set 105.

The central processing unit 140 then transmits the call incoming information formed upon reception of a terminating call to the common line signal control unit 150. The common line signal control unit 150 transmits the received call incoming information to the signal trunk 130 through the time-division network 110. The signal trunk 130 transmits the received call incoming information to the signal trunk 132 of the switching unit 102. The signal trunk 132 transmits the receiving call incoming information to the common line signal processing unit 151 through the time-division network 111. The common line signal processing unit 151 transmits the received call incoming information to the central processing unit 141. The central processing unit 141 collates the received call incoming information with the subscriber information of the subscriber telephone set 106 which is stored in the started subscriber information storage unit 180. If the central processing unit 141 detects that this terminating call is the one to be transferred to the subscriber telephone set 105 of the switching unit 102, the central processing unit 141 determines whether the subscriber telephone set 105 is busy. If the central processing unit 141 determines the non-busy state of the subscriber telephone set 105, it transmits call incoming enable information to the common line signal processing unit 151. The common line signal control unit 151 transmits the received call incoming enable information to the signal trunk 132 through the time-division network 111. The signal trunk 132 transmits the received call incoming enable information to the trunk 130 of the switching unit 101. The signal trunk 130 transmits the received call incoming enable information to the common line signal processing unit 150 through the time-division network 110. The common line signal processing unit 150 transmits the received call incoming enable information to the central processing unit 140. Upon reception of the call incoming enable information, the central processing unit 140 connects the terminating call to the speech path trunk 120 through the time-division network 110. The speech path trunk 120 transmits a start signal to the speech path trunk 122 of the switching unit 102 connected to the speech path trunk 120 to request connection of the terminating call. Upon reception of the start signal, the speech path trunk 122 transmits start information to the central processing unit 141 through the time-division network 111. The central processing unit 141 transmits a ringing tone output instruction to the subscriber circuit 170 through the time-division network 111 and the subscriber control circuit 160. The subscriber circuit 170 sends a call signal to the subscriber telephone set 105. When the subscriber telephone set 105 responds to the call signal, the subscriber circuit 170 detects this response operation and outputs response information to the central processing unit 141 through the subscriber control circuit 160 and the time-division network 111. Upon reception of the response information, the central processing unit 141 sends a speech path setting instruction to the speech path trunk 122, the subscriber control circuit 160, and the subscriber circuit 170 through the time-division network 111. A speech signal from the speech path trunk 120 of the switching unit 101 is transmitted to the subscriber telephone set 105 through the speech path trunk 122 of the switching unit 102, the time-division network 111, the subscriber control circuit 160, and the subscriber circuit 170.

According to this embodiment, with reference to the subscriber group information stored in the subscriber information storage units 180 and 181, the terminating call to the subscriber telephone set 106 can be transferred to the subscriber telephone set 105 accommodated in the fault-free exchanging unit 102 belonging to the same group as that of the call incoming destination telephone set 106.

The central processing unit 140 of the switching unit 101 transmits the fault information of the switching unit 103 to the switching unit 102 upon reception of the terminating call to the subscriber telephone set 106. However, the central processing unit 140 may transmit the fault information of the switching unit 103 to the switching unit 102 immediately after the fault information of the switching unit 103 is informed. In this case, the central processing unit 141 of the switching unit 102 which has received the fault information of the switching unit 102 may immediately start the subscriber information storage unit 181 or may start it upon reception of the call incoming information. The central processing unit 140 of the switching unit 101 independently receives the fault information of the switching unit 103 and the call incoming information. However, these pieces of information may be simultaneously received or converted into one information which is then transmitted. In the above embodiment, the fault has occurred in the switching unit 103. However, a terminating call may be transferred to the switching unit 103 in the same manner as described above.

As has been described above, according to the present invention, a terminating call to a subscriber line accommodated in a switching unit in which a fault has occurred to disable call processing is assigned to another switching unit and is transferred to a subscriber line accommodated therein, thereby remedying the terminating call to a subscriber group.

What is claimed is

1. An incoming call control method comprising:
  the step of setting a subscriber group comprising a plurality of subscriber telephone sets respectively connected to a plurality of lower switching units and sharing an incoming call, wherein each of said lower switching units comprises a first storage unit for storing a number of a subscriber group to which a certain subscriber telephone set connected to a home switching unit belongs, and subscriber group information consisting of a subscriber number of a subscriber telephone set connected to a distant switching unit constituting the subscriber group to which said certain subscriber telephone set belongs, said host switching unit comprises a second storage unit for prestoring all subscriber group information of said plurality of lower switching units which are stored in said first storage unit;
  the step of causing a host switching unit connected to said lower switching units to monitor that a fault has occurred in one of said lower switching units;
  the assignment step of, when an incoming call is made for one of said subscriber telephone sets connected to said one of said lower switching units in which the fault has occurred, causing said host switching unit to assign the incoming call to one fault-free lower switching unit which is connected to a given subscriber telephone set belonging to a same subscriber group as that of a call incoming destination subscriber telephone set in said subscriber telephone sets and further causing said host switching unit and said fault-free lower switching unit to assign the incoming call with reference to the subscriber group information stored in said first and second storage units; and the transfer step of causing said one fault-free lower switching unit to transfer the incoming call to said given subscriber telephone set belonging to the same subscriber group as that of said call incoming destination subscriber telephone set.

2. A method according to claim 1, further comprising the step of holding fault information representing said one lower switching unit in which the fault has occurred on the basis of a fault recognition result, so that said host switching unit determines on the basis of the fault information held in said host switching unit whether a fault has occurred in said fault-free lower switching unit accommodating said given subscriber telephone set belonging to the same subscriber group as that of said call incoming destination subscriber telephone set for the incoming call in said plurality of subscriber telephone sets.

3. A method according to claim 1, wherein the assignment step further comprises the step of transmitting the fault information representing said one lower switching unit in which the fault has occurred to said one fault-free lower switching unit connected to said given subscriber telephone set belonging to a same subscriber group as that of said call incoming destination subscriber telephone set, and the step of starting said first storage unit arranged in said one fault-free lower switching unit to which the incoming call is assigned upon reception of the fault information.

4. A method according to claim 3, wherein the transfer step further comprises the step of transmitting call incoming information formed on the basis of the incoming call to said one fault-free lower switching unit to which the incoming call is assigned by said host switching unit, the step of collating the received call incoming information with the subscriber group information stored in said first storage unit arranged in said one fault-free lower switching unit to which the incoming call is assigned, the step of, when said call incoming destination subscriber telephone set belongs to a same subscriber group as that of said certain telephone set connected to said home switching unit and said certain subscriber telephone set connected to said home switching unit belonging to a same subscriber group as that of said call incoming destination subscriber telephone set is set in an idle state, transmitting call incoming enable information from said one fault-free lower switching unit to which the incoming call is assigned to said host switching unit, the step of connecting the incoming call from said host switching unit to said one fault-free lower switching unit to which the incoming call is assigned, upon reception of the call incoming enable information, sending a ringing signal to said certain subscriber telephone set as a transfer destination, and the step of, when said certain subscriber telephone set as the transfer destination responds to the ringing signal, forming a speech path to said certain subscriber telephone set as the transfer destination connected to said one fault-free lower switching unit.

5. An incoming call control method comprising the steps of:

setting a subscriber group constituted by a plurality of subscriber telephone sets respectively connected to a plurality of switching units and sharing an incoming call;

recognizing occurrence of a fault in at least one of said switching units and holding the fault as fault information;

when an incoming call is made for one of said subscriber telephone sets connected to one switching unit in which the fault has occurred, assigning the incoming call to one fault-free lower switching unit which is connected to a given subscriber telephone set belonging to a same subscriber group as that of a call incoming destination subscriber telephone set in said subscriber telephone sets, on a basis of the held fault information, a prestored number of a subscriber group to which a certain subscriber telephone set connected to a home switching unit belongs, and a prestored subscriber group information consisting of a subscriber number of a subscriber telephone set connected to a distant switching unit constituting the subscriber group to which said certain subscriber telephone set belongs; and causing said one fault-free lower switching unit to transfer, in accordance with the subscriber group information, the incoming call to said given subscriber telephone set belonging to the same subscriber group as that of said call incoming destination subscriber telephone set.

6. An incoming call control system comprising:

a plurality of subscriber telephone sets constituting a subscriber group arranged to share an incoming call;

a plurality of lower switching units respectively connected to said subscriber telephone sets constituting said subscriber group;

a host switching unit, connected to said lower switching units, for selectively connecting the incoming call to one of said lower switching units;

first storage means, arranged in each of said lower switching units, for storing a number of a subscriber group to which a certain subscriber telephone set connected to a home switching unit belongs, and subscriber group information consisting of a subscriber number of a subscriber telephone set connected to a distant switching unit constituting the subscriber group to which said certain subscriber telephone set belongs;

second storage means, arranged in said host switching unit, for prestoring all subscriber group information of said plurality of lower switching units which are stored in said first storage means;

first control means, arranged in said host switching unit, for monitoring a fault of said lower switching units and assigning, on the basis of the subscriber group information stored in said second storage means, the incoming call to one fault-free lower switching unit which is connected to a given subscriber telephone set belonging to a same subscriber group as that of a call incoming destination subscriber telephone set in said subscriber telephone sets when the incoming call is made to one of the subscriber telephone sets connected to said one lower switching unit in which the fault has occurred; and second control means, arranged in each of said lower switching units, for transferring the incoming call to the subscriber telephone unit belonging to the same group as that of the call incoming subscriber telephone set on a basis of the subscriber information stored in said first storage means when said first control means assigns the incoming call to said one fault-free lower switching unit.

7. A system according to claim 6, wherein said first control means monitors that a fault has occurred in at least one of said lower switching units, holds the fault as fault information, and assigns the incoming call on basis of the held fault information and the subscriber group information stored in said second storage means.

8. A system according to claim 7, wherein said first control means transfers the incoming call to said one fault-free lower switching unit immediately after said second control means arranged in said one lower switching unit in which the fault has occurred is informed of the incoming call transfer.

* * * * *